US011203828B2

(12) United States Patent
Keshavaraj

(10) Patent No.: US 11,203,828 B2
(45) Date of Patent: *Dec. 21, 2021

(54) AIRBAG MODULE

(71) Applicant: Milliken & Company, Spartanburg, SC (US)

(72) Inventor: Ramesh Keshavaraj, Peachtree City, GA (US)

(73) Assignee: Milliken & Company, Spartanburg, SC (US)

(*) Notice: Subject to any disclaimer, the term of this patent is extended or adjusted under 35 U.S.C. 154(b) by 65 days.

This patent is subject to a terminal disclaimer.

(21) Appl. No.: 16/808,842

(22) Filed: Mar. 4, 2020

(65) Prior Publication Data
US 2020/0199799 A1 Jun. 25, 2020

Related U.S. Application Data

(62) Division of application No. 14/833,392, filed on Aug. 24, 2015, now Pat. No. 10,619,281.

(51) Int. Cl.
D06B 21/00 (2006.01)
B60R 21/235 (2006.01)
D06N 3/00 (2006.01)

(52) U.S. Cl.
CPC ............ *D06B 21/00* (2013.01); *B60R 21/235* (2013.01); *D06N 3/00* (2013.01); *D06N 3/0056* (2013.01); *B60R 2021/23514* (2013.01); *B60R 2021/23542* (2013.01); *D06N 2203/00* (2013.01); *D10B 2505/124* (2013.01)

(58) Field of Classification Search
CPC .......... B60R 2021/23514; B60R 2021/23542; B60R 21/235; D06B 21/00; D10B 2505/124
See application file for complete search history.

(56) References Cited

U.S. PATENT DOCUMENTS

| 5,863,644 | A | 1/1999 | Bonigk et al. ................ 428/221 |
| 6,734,123 | B2 | 5/2004 | Veiga et al. ................... 442/149 |
| 6,815,022 | B2 | 11/2004 | Renck et al. ................. 428/34.3 |
| 7,517,570 | B1 | 4/2009 | Li et al. ...................... 280/728.1 |
| 7,543,843 | B2 | 6/2009 | Keshavaraj et al. ........ 280/728.1 |
| 7,686,331 | B2 | 3/2010 | Li et al. ...................... 280/743.1 |
| 8,408,595 | B2 | 4/2013 | Schindzielorz et al. ... 280/743.1 |
| 2002/0145276 | A1 | 10/2002 | Veiga ......................... 280/743.1 |
| 2002/0175510 | A1 | 11/2002 | Veiga |
| 2006/0122323 | A1 | 6/2006 | Dumont et al. .............. 524/862 |
| 2008/0169631 | A1 | 7/2008 | Hill |
| 2010/0129575 | A1 | 5/2010 | Veiga .......................... 428/35.4 |

(Continued)

FOREIGN PATENT DOCUMENTS

| CA | 2185767 | 3/1997 |
| CN | 101331038 | 12/2008 |

(Continued)

Primary Examiner — Arti Singh-Pandey
(74) Attorney, Agent, or Firm — Cheryl Brickey

(57) ABSTRACT

An airbag textile containing a woven textile having an inner side and an outer side, a primer layer on the outer side of the textile and a gas barrier layer on the primer layer. The primer layer contains a first thermoplastic polymer and has a surface roughness and a plurality of holes extending at least partially through the thickness of the primer layer. The gas barrier layer contains a second thermoplastic polymer and at least partially fills in the surface roughness and holes of the primer layer.

8 Claims, 1 Drawing Sheet

(56) References Cited

U.S. PATENT DOCUMENTS

2015/0267344 A1   9/2015   Blackwood et al. .......... 442/64
2016/0273157 A1   9/2016   Akechi

FOREIGN PATENT DOCUMENTS

| CN | 104768743 | 7/2015 |
|----|-----------|--------|
| EP | 1887060 | 2/2008 |
| JP | H05319194 | 12/1993 |
| JP | H09240405 | 9/1997 |
| JP | 2004522003 | 7/2004 |
| JP | 2007229939 | 9/2007 |
| JP | 2009518548 | 5/2009 |
| JP | 2013067385 | 4/2013 |
| KR | 2014070444 | 6/2014 |
| WO | WO 2002/018180 | 3/2002 |
| WO | 2010042334 | 4/2010 |

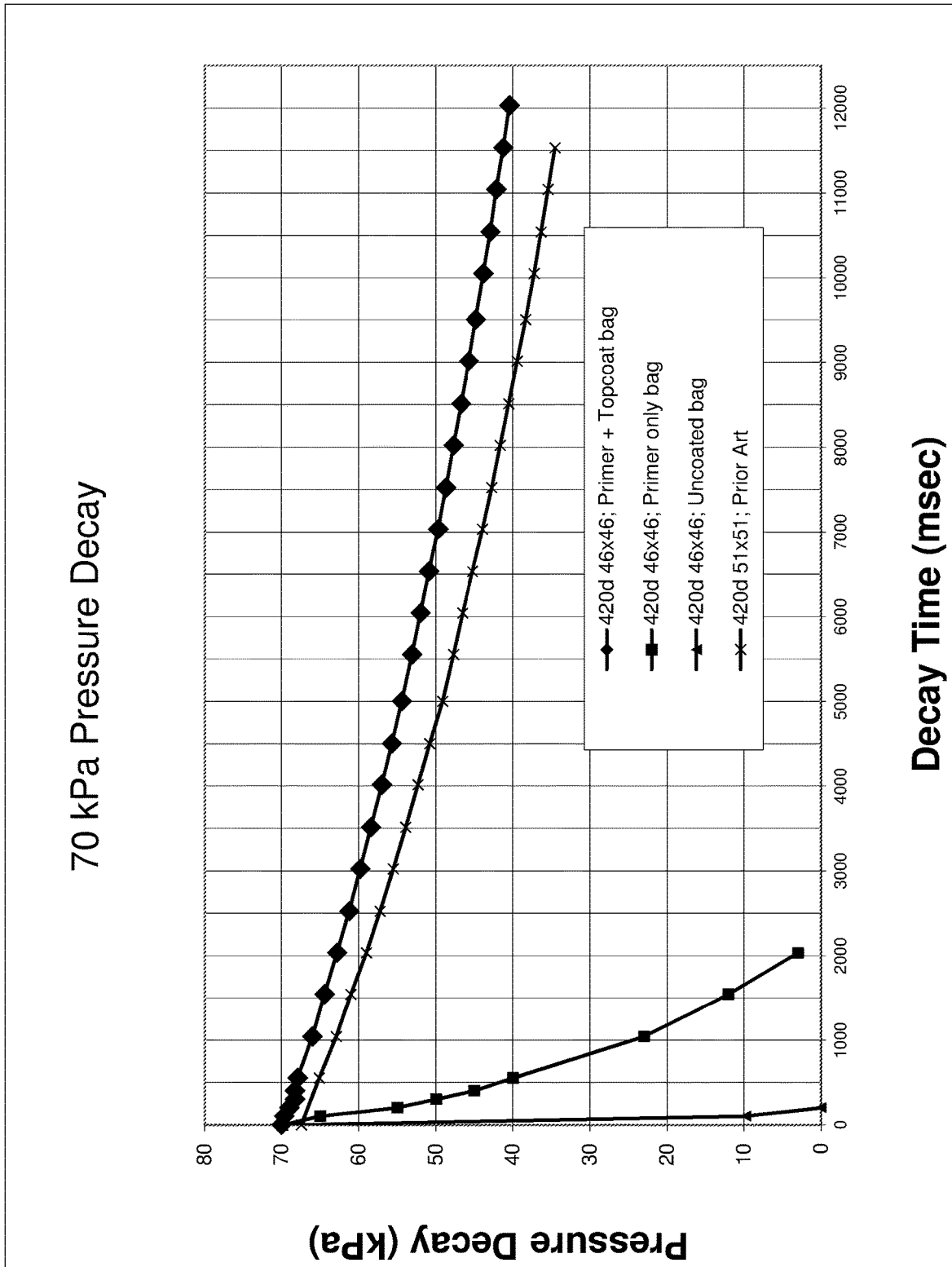

AIRBAG MODULE

RELATED APPLICATIONS

This application is a Divisional Application of co-pending U.S. patent application Ser. No. 14/833,392, filed on Aug. 24, 2015, which is herein incorporated by reference in its entirety.

TECHNICAL FIELD OF THE INVENTION

The invention provides a coating composition suitable for use on airbags, an airbag coated with such a composition, a method for making such an airbag, and an airbag module comprising such an airbag.

BACKGROUND

Airbags for motor vehicles have become ubiquitous in passenger vehicles. These airbags are installed at strategic points in the passenger compartment of a vehicle and, in the event of a collision, are rapidly inflated with gas so that they act as an energy absorbing barrier between the vehicle occupant and an interior surface of the passenger compartment (e.g., steering wheel, dashboard, or windows). For example, side curtain airbags typically are installed within one or more of the pillars of the vehicle so that they provide protection during roll-over or side impact collisions. With the advent of such airbags, manufacturers began coating the airbag textile to modify the gas permeability of the textile, enabling the airbags manufactured from the textile to stay inflated for longer periods of time and provided the needed protection during the collision event.

There are many types of coating compositions used to produce such coated textiles, but one class of coating composition that is quite popular is a dispersion of a polymer in a suitable medium (e.g., aqueous medium). And while these dispersion-based systems are popular, they are not free from drawbacks and difficulties unlike solvent based systems.

In view of the foregoing, it can be seen that a need remains for coating compositions and coated airbag textiles that can meet the demanding needs of the automotive airbag industry while addressing some of the problems inherent in current coating compositions and coated textiles. Applicants believe that the coating composition and coated airbag described in the present application meet this need.

BRIEF SUMMARY OF THE INVENTION

An airbag textile containing a woven textile having an inner side and an outer side, a primer layer on the outer side of the textile and a gas barrier layer on the primer layer. The primer layer contains a first thermoplastic polymer and has a surface roughness and a plurality of holes extending at least partially through the thickness of the primer layer. The gas barrier layer contains a second thermoplastic polymer and at least partially fills in the surface roughness and holes of the primer layer.

BRIEF DESCRIPTION OF THE FIGURES

An embodiment of the present invention will now be described by way of example, with reference to the accompanying drawings.

FIG. 1 is a graph of the comparison of leakage through airbags being uncoated, curtain coated with primer, and curtain coated with primer plus the top coat.

DETAILED DESCRIPTION OF THE INVENTION

The present invention allows the reduction in the number of warp yarns and/or weft yarns per inch construction of a textile in the airbag end-use application enabling a reduced cost of the substrate, reduced cost of the coating chemistry, improved fabric tear, increased seam combing resistance, and reduced weight of the airbag.

Some previous approaches have centered on laminating the airbag textile with a pre-cast film through an adhesive means that is chemically activated or through heat in case if a bi-component film is used in the application. In either scenarios, the penetration of the film does not reach the valleys of the yarn bundles that are much deeper because of reduced construction of the airbag substrate. It is also not possible to guarantee that each laminated cushions will have optimal adhesion of both mechanical and chemical nature for the system to provide consistent performance.

In one embodiment, the invention provides an airbag. The airbag can be suitable for use as any airbag in a motor vehicle, such as a frontal impact airbag (e.g., driver or passenger-side frontal impact airbag) or a side impact airbag (e.g., side curtain airbag or side torso airbag). The airbag comprises a textile substrate and a coating of a primer layer on at least a portion of the textile substrate and a coating of a gas barrier layer on at least a portion of the primer layer. The airbag can also be configured to enclose an interior volume. For example, the airbag can comprise at least two discrete textile substrates that are sewn, stitched, or otherwise bonded together in such a way as to enclose an interior volume that can be inflated. Alternatively, the airbag can be a one-piece woven airbag, which essentially comprises a textile substrate having two layer areas and single layer areas where the two layers are woven together to enclose an interior volume that can be inflated. Such one-piece woven airbags and suitable constructions for the same are described, for example, in U.S. Pat. Nos. 7,543,609; 7,409,970; 7,069,961; 6,595,244; and 6,220,309.

The textile substrate of the airbag can be any suitable textile substrate having an inner side and an outer side. Preferably, the textile substrate is a woven textile. Such woven textiles comprise a plurality of yarns interlaced in a suitable weave pattern, such as a plain weave, twill weave or a satin weave. Preferably, the textile substrate is a woven textile constructed in a plain weave. The woven textile can be constructed from any suitable yarn or combination of yarns. Preferably, the textile substrate is a woven textile comprising a plurality of synthetic yarns. The synthetic yarns can comprise any suitable synthetic fibers. Preferably, the synthetic yarns comprise fibers selected from the group consisting of polyamide fibers (e.g., nylon 6 fibers, nylon 6,6 fibers), polyester fibers (e.g., polyethylene terephthalate fibers, polytrimethylene terephthalate fibers, polybutylene terephthalate fibers), polyolefin fibers, and mixtures thereof. In a more preferred embodiment, the synthetic yarns comprise fibers selected from the group consisting of polyamide fibers, polyester (PET) fibers, polyolefin fibers, polytrimethylene terephthalate (PTT), and mixtures thereof.

The yarns used in making the textile substrate can have any suitable linear density. Preferably, the yarns have a linear density of about 100 dtex or more or about 110 dtex or more. Preferably, the yarns have a linear density of about 1,500 dtex or less, or about 700 dtex or less. The yarns used in making the textile substrate preferably are multifilament yarns, which means each yarns comprises a plurality of filaments or fibers, such as those mentioned above. In such multifilament yarns, the filaments or fibers preferably have linear densities of about 7 dtex or less, or about 5 dtex or less (e.g., about 4.5 dtex or less).

A least a portion of the outer surface of the textile substrate comprises a primer layer. Preferably, the primer layer is substantially coextensive with the surface of the textile substrate, or at least substantially coextensive with that portion of the surface that overlies the enclosed volume of the airbag. The primer layer is preferably a very low density colloidal coating so that penetration through the loosely construction textile substrate can be controlled to minimize or eliminate strike through of the coating to the inner side of the textile (side of the textile opposite to the side the coating is applied). This is achieved with the inventive formulation even if the construction is reduced by about 10 percent on both the warp and the weft direction. For example the standard construction of airbag fabric used in gas holding applications has a cover factor of over 2000 as calculated by the equation [($\sqrt{}$denier of warp yarn)*number of warp yarns/in+($\sqrt{}$denier of the weft yarn)*number of weft yarns/in]. If one skilled in the art were to consider a 420d yarn, then a construction of 51×51 would be a standard construction for very low permeability fabric with a leakage of less than 400 mm/sec when measured with a Textest FX3350 dynamic air perm tester. Such a fabric will have a cover factor of 2090. If the construction were to be reduced by about 10%, say to 46×46 with the same 420d yarn and a resultant cover factor of 1885, the permeability of the fabric more than doubles to 850 mm/sec because of the increased openness. The inventive coating formulation has been found to reduce the permeability of lower construction fabrics to levels of current gas holding fabrics when both are coated, i.e., the role played by the construction in reducing air permeability is not a factor with the disclosed coating.

Preferably, the primer layer is applied as a very low density coating with its penetration through the textile substrate controlled such that the inner side of the textile substrate (opposite side to the outside which is coated with the primer layer) is essentially free of the first thermoplastic polymer.

The starting material for the primer layer is preferably a polymer dispersion that is aerated by physical or chemical means when it is applied to the textile substrate to the extent that about 300% of gas is incorporated into the dispersion. Prior to the aeration process, the ingredients (the first thermoplastic polymer and other additives) are first blended into the mix like flame retardants, stabilizers like surfactants that delay the collapse of the gaseous species when incorporated in the dispersion, pigment and other additives/fillers. Once the coating is applied to the textile substrate, the gaseous components are completely or partially removed from the coating layer in a drying process. During the drying process the viscosity of the coating will drop once the gas escapes and it is preferable to cast the film on to the outer surface of the textile substrate before this stage of drying to avoid coating strikethrough the fabric.

In the blending step, the ingredients are blended to the appropriate starting viscosity before the gaseous species are injected to a pre-determined level based on the target density of the mix. Stabilizers may be used in the aerated mix and the thickened/aerated mixture is then delivered to the coating head. A continuous traverse mechanism of delivery of the mix to the coating head, a more sophisticated control of the half live of the bubble through a parabolic type head delivery system, or other delivery systems may be used.

Gas emulsions are colloids with gas as the dispersed phase and a liquid as the continuous phase. Gas emulsions with high fraction of gas, i.e, more than 50% of the composition is gas are called foams. Foam is not a solid, liquid or a gas, it possesses the characteristics of all three forms of matter. The structure of the foam is an important factor when it comes to using gas emulsions as coatings. The stability and rheology of the gas emulsions are two important parameters when it comes to applying the foams as a coating. The structure of the emulsion/foam is characterized by the blow ratio and the bubble size distribution. The blow ratio is the volumetric ratio of the gas to the liquid. The rheology will change as a function of the bubble size in gas emulsions. If the mean bubble diameter is smaller, the viscosity of the emulsion will tend to be higher.

It has been found that when coating lower density/looser construction fabrics where the objective is to have a dried film on predominately or only one surface after drying or curing, the gas emulsions and its properties are an important intermediate step. As the liquid drains between the bubble boundary layer, it will collapse the bubble very quickly, hence, it is important to skin the layer at the fabric interface in order to prevent the liquid from strikethrough the fabric. The control of the film forming during the drying step is one important parameter to be controlled in the chemistry and process.

In one embodiment, primer coating composition was a 60% solids dispersion of polyurethane that is blended with a flame retardant, pigment, stabilizing surfactant, filler and thickener for the gaseous species along with a thickening agent. The mix was thickened to a desired viscosity that is needed for a coating application. The mix then gets passed through a generator where gas is incorporated into the mix such that the density of the thickened mix is reduced substantially. The aeration ratio that was established is as follows: for 100 ml of the thickened starting mix, the incorporation of air would increase the final mix to approximately 300 ml. In this embodiment, the primary foaming agent was a mixture of an amphoteric surfactant and a nonionic surfactant. The thickeners provide a secondary function on foam generation and stabilization.

In one embodiment, the proposed process creates a microheterogeneous colloidal system in which a gas is distributed within a liquid dispersing agent. When air is passed through a surfactant solution the surfactant is adsorbed on the surface of the bubbles to form a film. As the bubbles break through the liquid/air interface, a double film is formed, i.e. a foam lamella consisting of two monomolecular films of surfactant and the inter-lamellar liquid. The accumulation and reciprocal contact of the bubbles in the liquid plays a part in this film formation process. Foams with considerably longer stability or half-life can be produced with substances which cause a considerable decrease in the surface tension of water (e.g. soaps, non-ionic, cationic and amphoteric surfactants).

Thermodynamically, foams are unstable systems as they have a higher free surface-energy potential than the starting materials (liquid and air) from which they are formed. Consequently, all foams have a tendency to decompose and are therefore unstable or, at best, metastable. Aerating the primer layer does two thing that is not possible by other means. At the air/water interface where the air bubbles are produced by mechanical action, the surfactant molecules accumulate in such a way that, depending on their structure, the hydrophilic part is aligned in the water phase and the hydrophobic part in the gaseous phase. When a concentrated assembly or accumulation of such discrete bubbles are present in a liquid a spherical foam exists. By contrast, a polyhedron foam is an aggregation of polyhedron-shaped bubbles which have lost autonomous existence. Polyhedron foam may be formed through drainage of the inter-lamellar liquid from aspheroid foam. The thickness of the liquid lamellae is approximately 500 nm, and the "isolated" spherical foam is considerably less stable than the connected polyhedron foam. Metastable foams are characterized by the fact that, after a certain time, the liquid ceases to drain and a metastable structure comes into being. This state is achieved by retarding the thinning of the lamellae so that bursting of the bubbles is delayed. The formulation developed in this invention is very stable after aeration in that the volume does not collapse even after 48 hours. The incorporation of the gaseous species can be contemplated in various stages by those skilled in the art and still not deviate from the teachings of this invention.

The foam may be delivered to the textile substrate in any suitable manner. One method involves a closed loop system and another involves a direct air over knife application where the foamed liquor is deliver in open air through a traverse moving delivery pipe.

To the contrary belief, when the construction of the fabric is reduced (the fabric weave is more open with less warps and/or weft per inch) it is more difficult to stabilize the fabric with a liquid dispersed in a liquid system by just changing the rheology. This means that an increase in viscosity and modified rheology alone will not typically yield the results because the dispersion will eventually shear thin and flow through the textile substrate to the other side. One mechanism that has found to stabilize the fabric in the first layer is to decrease the density of the dispersion by about half or more. The application of such a low density coating on a loose construction fabric is an important step. Since the density is substantially reduced, the penetration of the mix into a loose construction fabric has to be reduced substantially. With the choice of the appropriate gas stabilizing surfactant in the system, the gas species is removed quickly in the oven and coating is completely collapsed resulting in a continuous layer of coating. During the collapsing process, it was discovered even though the density of the coating increases, the viscosity can be controlled to not drop quick enough to cause coating penetration or strike through the fabric.

Such foam coatings however have a high degree of permeability and, weight for weight, they are more opaque/ open structure than direct coated (non-foamed) material. This process of gas exhaustion creates holes and voids within the primer layer. From a gas holding application perspective, these voids leave the fabric to be more permeable for a gas holding device, hence a second gas barrier layer may be applied over the primer layer in order to achieve a gas retaining composite when needed. Even though the fabric construction is more open, the two layer coating system of the invention provides equivalent performance compared to traditional high construction fabrics with similar coat weights. This system overall provides better gas holding properties than a film because of the adhesion development of the liquid primer layer that is not achievable with pre-formed films as the surface area for achieving adhesion is higher with liquids.

In one embodiment, the first thermoplastic polymer is a thermoplastic polymer selected from the group consisting of polyurethane, polyacrylate, acrylic co-polymer, polyurethane-polyacrylate hybrid, acrylic, vinyl acetate, vinyl chloride, vinyl alcohol, urethane, styrene butadiene, acrylonitrile, ethylene vinyl acetate, and ethylene vinyl chloride, vinylidene chloride, polyvinyl chloride, polyvinyl butyral, silicone, and hybrid resins thereof. In another embodiment, the first thermoplastic polymer is selected from the group consisting of acrylic, vinyl acetate, vinyl chloride, vinyl alcohol, urethane, styrene butadiene, acrylonitrile, ethylene vinyl acetate, and ethylene vinyl chloride, vinylidene chloride, and is preferably an acrylic latex such as TR77, HAS. HA16, TR934, TR407 (Rohm and Haas) or 21638 (Hycar), HYCAR 561×87 or HYCAR 26804 (B.F. Goodrich), Paranol AC 793, Paranol AC 774.

The primer layer can be present on the textile substrate in any suitable amount. Preferably, the primer layer is present on the textile substrate in an amount of about 40 g/m$^2$ or less, about 35 g/m$^2$ or less, about 30 g/m$^2$ or less, or about 25 g/m$^2$ or less.

The primer layer has a surface leakage (on the surface of the primer layer facing away from the textile substrate) and a plurality of holes at least partially through the thickness of the primer layer. As a result the leakage of the fabric after the primer is applied is not substantially lower than the uncoated fabric, but the primer layer provided the important function of locking the yarns in place without coating penetration to the other side. Double woven curtain airbags were made with a 420d/470dtex yarn at 46×46 construction and they coated with inventive primer followed by the top coated disclosed in this invention. The leakage of the curtain airbags were measured by subjecting the airbags to a pressure differential of 70 kPa and measure the pressure retained over time and are shown in FIG. 1. Comparison of the leakage is made in the uncoated state, primer only stage and primer plus the top coat stage as per the disclosed invention. As will be obvious to those skilled in the art that the primer layer locks the yarns in the lower construction fabric even though it does not provide a substantial improvement in leakage, but provides the a stable base for the top coat to seal the holes and provided the needed gas holding capability.

Preferably, a gas barrier layer is located on the primer layer (on the side of the primer layer opposite to the textile substrate) and contains a second thermoplastic polymer. The gas barrier layer may be formed from any suitable materials. In a preferred embodiment, the second thermoplastic polymer is selected from the same listing of polymer as the first thermoplastic polymer. More particularly, in one embodiment, the second thermoplastic polymer is a thermoplastic polymer selected from the group consisting of polyurethane, polyacrylate, acrylic co-polymer, polyurethane-polyacrylate hybrid, acrylic, vinyl acetate, vinyl chloride, vinyl alcohol, urethane, styrene butadiene, acrylonitrile, ethylene vinyl acetate, and ethylene vinyl chloride, vinylidene chloride, polyvinyl chloride, polyvinyl butyral, silicone, and hybrid resins thereof. In another embodiment, the second thermoplastic polymer is selected from the group consisting of acrylic, vinyl acetate, vinyl chloride, vinyl alcohol, urethane, styrene butadiene, acrylonitrile, ethylene vinyl acetate, and ethylene vinyl chloride, vinylidene chloride, and is preferably an acrylic latex such as TR77, HAS. HA16, TR934, TR407 (Rohm and Haas) or 21638 (Hycar), HYCAR 561X87 or HYCAR 26804 (B.F. Goodrich), Paranol AC 793, Paranol AC 774. In a preferred embodiment, the second thermoplastic polymer is the same thermoplastic polymer as the first thermoplastic polymer.

Preferably, the gas barrier layer is coated onto the primer layer as a liquid coating (not as a foam) and at least partially fills in the surface roughness and holes in the primer layer thereby creating a more smooth surface and a lower air diffusion.

In one embodiment, the gas barrier layer has a thickness great enough to even out at least some of the surface roughness of the primer layer. In another embodiment, the gas barrier layer has a thickness great than the thickness of the primer layer. In another embodiment, the gas barrier layer has an add-on between about 10 to 25 gsm. In another embodiment, the gas barrier layer has an add-on between about 15 and 20 gsm, more preferably between about 10 and 15 gsm.

By coating the textile with the primer layer first, then the gas barrier layer on the primer layer, the preferred construction where essentially no first thermoplastic or second thermoplastic is on the inner side of the textile may be realized.

In one embodiment, additional primer layers and/or gas barrier layers may be on the textile, such as placing a coating layer (primer and/or gas blocking layer) on the inner side of the textile, applying two primer layers onto the outer side of the textile, or applying two gas blocking layers onto the outer side of the textile. It may be beneficial to have two thinner layers applied rather than one thicker layer in some embodiments.

In one embodiment, the primer layer and/or the gas barrier layer is further cured crosslinked. Some crosslinkers that may be employed include isocyanates, reactive epoxy resin, carbidiimides, melamine resin, and silanes. In some situations the advantage of having a cross linker can be realized by those skilled in the art. The present invention can optionally include cross linkers that are external cross linkers. Examples of such cross linkers are isocynates, reactive epoxy resins, carbodiimides. The melamine resin, such as Aerotex 3030, Aerotex M-3 or Permafresh MEL, can be used to secure the polymer plus filler that can be incorporated in the foam to the synthetic fibers of the woven substrate. A suitable catalyst, such a diammonium phosphate, magnesium chloride, ammonium chloride or ammonium sulfate can be included to cure the melamine resin. Catalyst concentration in the range of 0.2 to 5.0% of the formulation should be sufficient. Diammonium phosphate provides an exceptionally hard cure which improves the fabric's permeability. Detacifiers, when used, reduce the tendency of the fabric to stick to itself. Surface lubricants give the finished fabric a good hand. Ampitol PE30 from Dexter Chemicals is a suitable lubricant in this application.

Materials that provides resistance for aging of the polymeric coatings can be incorporated into any of the layers. For example Light/UV protection can be improved with hydroxybenzotriazoles, zinc dibutilthiocarbamate, 2, 6-di-tertiary butylacetol, hydrobenzophenols, hindered amines. Antioxidants like sterically hindered phenols, arylamines, phosphite stabilizers, hindered amine stabilizers (HAS) and others can be used by those skilled in the art. In case of use of polyester based polymers compounds in this invention, hydrolysis resistance can be improved with sterically hindered aromatic carbodiimides.

Fillers can be used in the gaseous emulsions, preferred would be particulate or fibrous in nature. Because of the stability needed in these gaseous emulsions, organic fillers are preferred. For example, organic fillers like styrene-acrylonitrile copolymers or specific polyols with unique properties can be used.

Other organic fillers can be contemplated by those skilled in the art. It has been found that interestingly inorganic fillers can also be used in this invention, such as barium sulfate, calcium carbonate, certain clays, expanded silica, colloidal silica, silicates, short fibers, glass microspheres, milled glass, bentonite, antimony trioxide, kaolin, ATH etc. Such fillers can be optionally surface treated for example with silanes or titanates for better dispersion characteristics or adhesion. Optionally a wetting agent may be employed to improve the blend stability, for example salts of sodium hexametaphosphate can be used.

In addition to the fillers, the composition of the primer and/or gas blocking layers might contain flame retardants. As it is well known that in the presence of heat and oxygen, most organic materials will burn. Flame retardants are needed to reduce the flammability of such materials. Flame retardants that can be included to the coating include, but not limited to phosphonate esters, phosphate esters, halogenated phosphonate esters or combinations thereof. Examples of phosphonate esters include but not limited to dimethylphosphonate, diethy ethyl phosphonate. Examples of phosphate esters include TPP, RDP, BDP, CDP. In cases depending on the substrate type, halogenated flame retardants may be warranted and they can be either purely halogenated or could be halogenated phosphates. Examples for the former include deca bromodiphenyl ethane, reactive flame retardants like dibromopropanol, tetrabromopthalate diol, tetrabromopthalic anhydride, etc.

Examples of halogenated phosphate esters include but not limited to TCCP; Tris (2-chloroisopropyl) phosphate (TCEP); Pentabromodiphenyl oxide; tetrakischloroethyl 1-2,2-bis (chloromethy) propylene di phosphate; TDCP; Dibromopropanol, Diester/ether diol of tetrabromopthalic anhydride; Tertabromo pthalate diol; Tetrabromopthalic anhydride; antimony trioxide;

Some of the flame retardants can be used as fillers as well and such flame retardants include zeolites, hydrated phosphates, ATH, MDH, alkali silicates, borates, borosilicates, melamine, graphite, graphene, mica, vermiculites, alumina, aluminum hydroxide, perlites, antimony trioxide, polyphosphate, ATH, melamine can be chosen based on the substrate of the fabric by those skilled in the art.

Halogen free flame retardants can also be used in this invention based on the substrate, Diethylethane phosphonate (DEEP); Triethylphosphate (TEP); Dimethylpropylphosphate (DMPP); Diphenylcreysl phosphate (DCP). Non-reactive liquids like TCPP, TCEP; and solid flame retardants like The present invention can optionally include thickeners based on the construction of the coating substrate and examples that is known in the art but not limited to are WT-56, Alcogum, paragum, Borchi gel, methocel.

Anti-blocking additives can be utilized based on the polymers, metal soaps such as zinc stearate, ester based oils, silica, waxes, silioxanes, clays, Silicone dispersions like MF-56, ceramic bubbles. The effectiveness of the anti-blocking was measured per ISO test procedure 5978.

Multiple surfactants can be used in this invention, the primary one being the aid to disperse the gas homogenously into the formulation. These surfactants can be either anionic, cationic or zwetterionic depending on the properties of the starting dispersion and the desired properties on the fabric. Some examples of such gas retaining surfactants include, but not limited to Octadecanoic acid, ammonium salt (1:1); Octadecanoicacid, ammonium salt (9Cl); Stearic acid, ammonium salt (8Cl); Ammoniumstearate; DC 100A; Kanebinol YC 81; Ligafluid AS 35; Nopco DC 100A; Nopcote DC100A; stanfax 320; Stokal STA; YC 8.

Once the gaseous species are introduced a second surfactant may be employed to stabilize gaseous species in the foam. Some examples of such gas retaining surfactants include, but not limited to Butanoic acid, 4-(octadecylamino)-4-oxo-2-sulfo-, disodium salt 4-(octadecylamino)-

4-oxo-2-sulfo-but; Butanoicacid, 4-(octadecylamino)-4-oxo-2-sulfo-, disodium salt (9Cl); Sodium lauryl sulfate; Succinamic acid,N-octadecyl-2-sulfo-, disodium salt (7Cl, 8Cl); Succinamic acid,N-octadecylsulfo-, disodium salt (6Cl); A 18; A 18 (surfactant); Aerosol 18; Alcopol FA; Alkasurf SS-TA; Astromid 18; Lankropol ODS/LS; Lipal NTD; Octosol A18; stanfax 318; Stokal SR. Zwitterionic surfactants can also be employed in certain cases to further enhance the stability of the gaseous species. Some the examples of such surfactants include, but not limited to, trimethylammoniocarboxylates, commonly known as betaines. Combination of the surfactants can also be employed.

Gaseous species or agents that can be incorporated in this invention can be air, mixtures of air, carbondioxide, helium, nitrogen, argon. Blowing agents can also be considered in this invention. For example, environmentally friendly blowing agent, a mixture of 1,1,1,3,3-pentafluorobutane and 1,1,1,2,3,3,3-heptafluoropropane (HFC 365/227) can also be used if unique properties are desired from the foam layer. The key is to incorporate the gaseous species after all the ingredients are blended into the system. Attached are some examples of the formulation used in this invention. The order of incorporation is dependent on the ingredients. pH adjustment might be warranted in some scenarios where the incorporation of subsequent components might de-stabilize the entire system otherwise.

The airbag may be used for any suitable purpose. In one embodiment, the airbag is part of an airbag module, where the airbag enclosing an interior volume and the module also contains a gas generator being connected to the airbag and a cover at least partially enclosing the airbag and gas generator. This airbag and/or airbag module may be used in any suitable device such as a vehicle like a sedan, truck, or SUV.

Examples of Formulation Prior to Introduction of Gaseous Species (Wet, Gm)

TABLE 1

| Formulation # | 1 | 2 | 3 | 4 | 5 | Prior art (liquid coating) |
|---|---|---|---|---|---|---|
| Polymer 1 | 1000 | 1000 | 0 | 500 | 500 | 1000 |
| Polymer 2 | 0 | 0 | 1000 | 500 | 0 | 0 |
| Acrylic/copolymer | 0 | 0 | 0 | 0 | 500 | 0 |
| Foaming surfactant | 30 | 20 | 20 | 20 | 15 | 0 |
| Foam stabilizer | 10 | 15 | 15 | 20 | 15 | 0 |
| Foam booster | 10 | 10 | 10 | 10 | 10 | 0 |
| Cross linker | 0 | 20 | 20 | 10 | 5 | 0 |
| Filler | 90 | 0 | 0 | 200 | 0 | 0 |
| Antioxidant | 0.5 | 0.5 | 0 | 0.5 | 0.5 | 0 |
| Pigment | 0.2 | 0.2 | 0.2 | 0.2 | 0.2 | 0.2 |
| Flame retardant | 20 | 20 | 20 | 20 | 20 | 20 |
| Thickener | 20 | 30 | 30 | 10 | 10 | 20 |
| FMVSS 302, mm/s | 9 | 0 | 0 | 0 | 0 | 0 |

Polymer 1 and 2 are acrylic latex commercially available from Rohm and Haas; Acrylic copolymer is sold under the trade name Hycar by Lubrizol Corporation; Foaming surfactant is Stanfax 320 commercially available from Parachem Corporation; Foam stabilizer is Alcopol FA commercially available from Ciba Specialty chemicals; Foam booster is Stanfax 318 commercially available from Parachem Corporation; Crosslinker is Acrafix FF commercially available from Tanatex Chemicals; Filler is ATH commercially available from Huber; Antioxidant is Irganox commercially available from BASF; Pigment is Levanyl commercially available from Lanxness; Flame retardant is Emerald 2000 commercially available from Great Lakes; Thickener is an associate thickener commercially available from Akzo Nobel. FMVSS 302 is the federal motor vehicle safety standard for flammability.

In the above examples, the chemicals were blended and thickened before the gas species were introduced in the same manner. Air was incorporated into the thickened formulation by introducing the blend into an industrial foaming equipment. The incorporation of air was such that a 100 ml of the infeed will result in an out-feed of 300 ml. In the above examples, the prior art is a formulation that was developed by the inventor and now an issued U.S. Pat. No. 7,543,843 that uses a polyurethane dispersion that provides very good gas retention properties.

TABLE 2

Gas retention comparison of prior art and the inventive coating on both nylon and polyester fabric.

| | Gas retention at 12 Seconds, starting at 70 kPa | | | |
|---|---|---|---|---|
| | Prior Art | | Invention | |
| | Nylon 420 d 51 × 51 | Polyester 500 d 51 × 51 | Nylon 420 d 46 × 46 | Polyester 500 d 46 × 46 |
| Coat Weight (GSM) | 33 | 35 | 25 | 32 |
| Primer weight (GSM) | | | 8 | 8 |
| As Received/Un-aged | 51.03 | 49.2 | 48.8 | 51.4 |
| EASC Heat aged, 105 C., 17 days | 50.83 | 50.2 | 51.6 | 53.9 |
| EASC RH aged, 80 C./95% RH, 17 days | 50.2 | 47.3 | 47.7 | 47.4 |
| EASC Cyclic aging, 14 days | 52.23 | 49.8 | 54.2 | 48.7 |

Test results from the leaked down testing of the prior art curtains with the nylon and polyester yarns and standard high constructions with cover factor over 2000 is compared to curtains with the same yarn and the inventive coating at cover factor less than 2000 (about 10% less yarn on both warp and weft directions) in Table 1. Further, the leak down performance for the curtains after aging under all the three aging scenarios of EASC specifications (EASC—European Airbag Standardization Committee issued specification not widely used globally by all Tier-1 airbag suppliers), i.e, dry heat, high heat/high humidity and cyclic aging are also compared to the respective un-aged curtains and the prior art. As it will be obvious to those skilled in the art the advantages of the inventive coating in terms of improved loom efficiency, lower cost fabric and lower cost coating.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. An airbag module comprising:
   (a) a one-piece woven, side impact airbag, the one-piece woven, side impact airbag enclosing an interior volume and comprising:
      i. a one-piece woven textile substrate having an inner side and an outer side, wherein the one-piece woven textile substrate comprises a plurality of yarns, the yarns comprising polyester or polyamide fibers having a linear density of about 110 dtex or greater, and wherein the textile substrate has a cover factor less than 2000;
      ii. a primer layer on at least a portion of the outer side of the textile substrate having a first thickness, wherein the primer layer comprises a first thermoplastic polymer, and wherein the primer layer has a surface roughness and a plurality of holes extending at least partially through the thickness of the primer layer, and wherein the inner side of the textile substrate is essentially free of the first thermoplastic polymer; and,
      iii. a gas barrier layer on the primer layer and having a second thickness, wherein the gas barrier layer comprises a second thermoplastic polymer, wherein the gar barrier layer at least partially fills in the surface roughness and holes of the primer layer wherein the second thickness is greater than the first thickness, and wherein the inner side of the textile substrate is essentially free of the second thermoplastic polymer, and,
   (b) a gas generator, the gas generator being connected to the said airbag
   (c) a cover at least partially enclosing the airbag and the gas generator.

2. The airbag module of claim 1, wherein the first thermoplastic polymer and second thermoplastic polymer are thermoplastic polymers selected from the group consisting of polyurethane, polyacrylate, acrylic co-polymer, polyurethane-polyacrylate hybrid, acrylic, vinyl acetate, vinyl chloride, vinyl alcohol, urethane, styrene butadiene, acrylonitrile, ethylene vinyl acetate, and ethylene vinyl chloride, vinylidene chloride, polyvinyl chloride, Polyvinyl butyral, silicone, and hybrid resins.

3. The airbag module of claim 1, wherein the primer layer is foam coated onto the first side of the woven textile.

4. The airbag module of claim 1, wherein the first thermoplastic polymer and the second thermoplastic polymer is the same type of thermoplastic polymer.

5. The airbag module of claim 1, wherein the primer layer further comprises at least one of an additive selected from the group consisting of flame retardant, pigment, stabilizing surfactant, filler, thickening agent, antioxidants, and stabilizers.

6. The airbag module of claim 1, wherein the gas barrier layer further comprises at least one of an additive selected from the group consisting of flame retardant, pigment, surfactant, filler, thickening agent, antioxidants, stabilizers, and anti-blocking agents.

7. The airbag module of claim 1, wherein the gas barrier layer is further crosslinked with crosslinked selected from the group consisting of isocyanates, reactive epoxy resin, carbodiimides, melamine resin, and silanes.

8. A vehicle comprising the airbag module of claim 1.

* * * * *

UNITED STATES PATENT AND TRADEMARK OFFICE
CERTIFICATE OF CORRECTION

PATENT NO. : 11,203,828 B2
APPLICATION NO. : 16/808842
DATED : December 21, 2021
INVENTOR(S) : Ramesh Keshavaraj Page 1 of 1

It is certified that error appears in the above-identified patent and that said Letters Patent is hereby corrected as shown below:

In the Claims

In Column 12, Line 11, "gar" should be replaced with "gas"

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*